United States Patent
Wakabayashi et al.

(10) Patent No.: US 12,441,896 B2
(45) Date of Patent: Oct. 14, 2025

(54) CONDUCTIVE COATING MATERIAL AND CIRCUIT FORMER

(71) Applicant: Fujikura Kasei Co., Ltd., Tokyo (JP)

(72) Inventors: Katsutomo Wakabayashi, Kuki (JP); Akinori Naruse, Kuki (JP); Yuka Azakami, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 18/857,654

(22) PCT Filed: Apr. 21, 2023

(86) PCT No.: PCT/JP2023/015879
§ 371 (c)(1),
(2) Date: Oct. 17, 2024

(87) PCT Pub. No.: WO2023/210522
PCT Pub. Date: Nov. 2, 2023

(65) Prior Publication Data
US 2025/0257227 A1   Aug. 14, 2025

(30) Foreign Application Priority Data
Apr. 27, 2022   (JP) .............................. 2022-073168

(51) Int. Cl.
*H01B 1/22*   (2006.01)
*C08K 3/08*   (2006.01)
(Continued)

(52) U.S. Cl.
CPC ................. *C09D 5/24* (2013.01); *C08K 3/08* (2013.01); *C08K 7/18* (2013.01); *C09D 7/61* (2018.01);
(Continued)

(58) Field of Classification Search
CPC ... H01B 1/00; H01B 1/22; C09D 5/24; C09D 11/52
See application file for complete search history.

(56) References Cited

U.S. PATENT DOCUMENTS 7,790,063 B2 *   9/2010   Kuwajima ............... H01B 1/02
                                                      252/514
8,993,895 B2 *   3/2015   Koshimizu ......... H01L 23/4985
                                                      174/250
(Continued)

FOREIGN PATENT DOCUMENTS

CN    106062084 A    10/2016
JP    2004176005 A   6/2004
(Continued)

OTHER PUBLICATIONS

English translation of form PCT/ISA/237 (mailed Jul. 2023).*
(Continued)

*Primary Examiner* — Mark Kopec
(74) *Attorney, Agent, or Firm* — Wood Herron & Evans LLP

(57) ABSTRACT

A conductive coating material includes a silicone resin (A), and a conductive powder (B) at a specific mass ratio, in which the conductive powder (B) includes a flake-shaped conductive powder (B1) having an average particle size of 1 to 7 μm and an amorphous conductive powder (B2) having an average particle size of 1 to 6 μm at a specific mass ratio, and Expression (1) below is satisfied, $100 \leq X1+X2 \leq 260$ (1), X1=(the average particle size of the conductive powder (B1)/a tap density of the conductive powder (B1))×(a content of the conductive powder (B1) with respect to a total mass of the conductive powder (B)), X2=(the average particle size of the conductive powder (B2)/a tap density of the conductive powder (B2))×(a content of the conductive pow-
(Continued)

der (B2) with respect to the total mass of the conductive powder (B)).

2 Claims, 1 Drawing Sheet

(51) Int. Cl.
    *C08K 7/18*    (2006.01)
    *C09D 5/24*    (2006.01)
    *C09D 7/40*    (2018.01)
    *C09D 7/61*    (2018.01)
    *C09D 183/04*  (2006.01)

(52) U.S. Cl.
    CPC .............. *C09D 7/69* (2018.01); *C09D 7/70* (2018.01); *C09D 183/04* (2013.01); *H01B 1/22* (2013.01); *C08K 2003/0806* (2013.01); *C08K 2201/001* (2013.01)

(56) References Cited

U.S. PATENT DOCUMENTS 9,153,355 B2 * 10/2015 Choi .................. C09D 11/52
11,739,232 B2 * 8/2023 Matsubara ............ C08K 3/08
                                                    252/514

FOREIGN PATENT DOCUMENTS

| JP | 2012054192 A | | 3/2012 | |
|----|--------------|---|--------|---|
| JP | 2015055615 A | * | 3/2015 | |
| JP | 2015110745 A | | 6/2015 | |
| JP | 2016003306 A | | 1/2016 | |
| JP | 2016089038 A | | 5/2016 | |
| JP | 2021138862 A | | 9/2021 | |
| KR | 20200044738 A | * | 4/2020 | ........... H05K 3/1283 |
| TW | 201829651 A | | 8/2018 | |
| WO | 2005041213 A1 | | 5/2005 | |
| WO | 2012086588 A1 | | 6/2012 | |

OTHER PUBLICATIONS

Fruh et al."Characterisation of silver particles used for the Low Temperature Joining Technology", 3rd Electronics System Integration Technology Conference ESTC, 2010 ieeexplore.ieee.org.*
Faddoul et al."Formulation and screen printing of water based conductive flake silver pastes onto green ceramic tapes for electronic applications" Materials Science and Engineering B 177 (2012) 1053-1066.*
PCT Office, International Search Report issued in PCT/JP2023/015879 dated Jul. 11, 2023.
Taiwan Patent Office, Notice of Allowance issued in TW 112114864 dated Mar. 14, 2024.

* cited by examiner

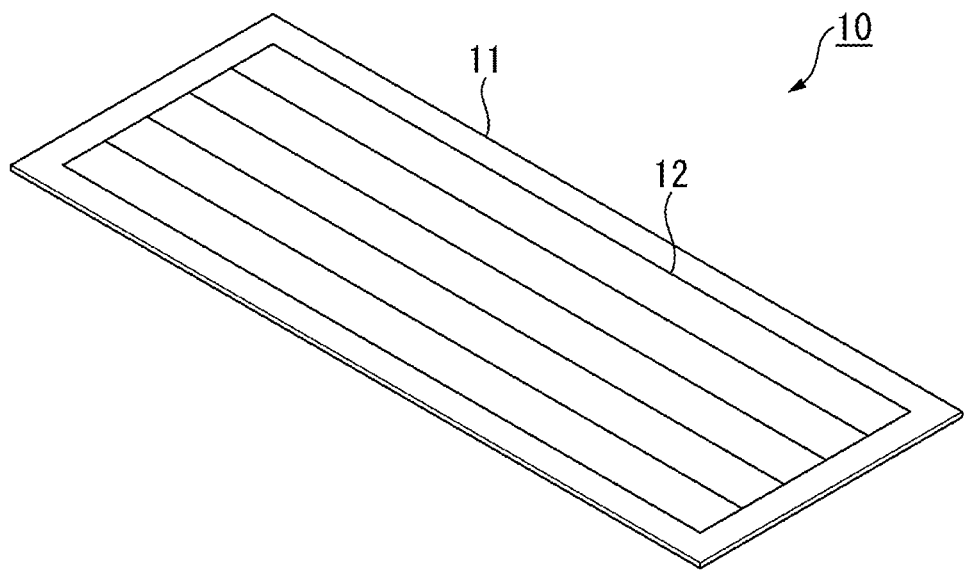

CONDUCTIVE COATING MATERIAL AND CIRCUIT FORMER

TECHNICAL FIELD

The present invention relates to a conductive coating material and a circuit former.

Priority is claimed on Japanese Patent Application No. 2022-073168, filed Apr. 27, 2022, the content of which is incorporated herein by reference.

BACKGROUND ART

In recent years, efforts have intensified to promote the spread of devices such as wearable devices, flexible printed substrates, and displays, which require flexibility and elasticity. These devices are usually formed by applying a conductive coating material including conductive particles and a binder resin onto a substrate having flexibility and elasticity. However, a coating film formed from the conductive coating material may also be required to have elasticity.

As a conductive member including wiring having elasticity, for example, Patent Document 1 discloses a conductive member including wiring formed by drying a conductive paste of a polyurethane dispersion liquid and conductive particles, and a plastic substrate.

CITATION LIST

Patent Document

Patent Document 1: Japanese Unexamined Patent Application, First Publication No. 2012-54192

SUMMARY OF INVENTION

Technical Problem

However, the coating film formed from a conductive coating material of the related art tends to break or increase in resistance value when subjected to repeated stretching and contracting, leading to a problem of instability in electrical resistance.

An object of the present invention is to provide a conductive coating material capable of forming a coating film that exhibits excellent durability and a small rate of change in resistance value even under repeated stretching and contracting.

Solution to Problem

The present invention has the following aspects.

[1] A conductive coating material, including:
a silicone resin (A); and
a conductive powder (B),
in which a mass ratio (A/B) of the silicone resin (A) to the conductive powder (B) is 10/90 to 35/65,
the conductive powder (B) includes a flake-shaped conductive powder (B1) having an average particle size of 1 to 7 µm and an amorphous conductive powder (B2) having an average particle size of 1 to 6 µm,
a mass ratio (B1/B2) of the conductive powder (B1) to the conductive powder (B2) is 40/60 to 90/10, and
Expression (1) below is satisfied, $$100 \leq X1 + X2 \leq 260 \quad (1),$$

X1=(the average particle size of the conductive powder (B1)/a tap density of the conductive powder (B1))×(a content of the conductive powder (B1) with respect to a total mass of the conductive powder (B)),
X2=(the average particle size of the conductive powder (B2)/a tap density of the conductive powder (B2))×(a content of the conductive powder (B2) with respect to the total mass of the conductive powder (B)).

[2] The conductive coating material according to [1],
in which the silicone resin (A) includes a curable silicone resin, and preferably includes at least one of an addition reaction-curable silicone resin and a condensation reaction-curable silicone resin.

[3] The conductive coating material according to [2],
in which the silicone resin (A) includes the addition reaction-curable silicone resin, and
the conductive coating material further includes one or more types of catalysts selected from among a platinum-based metal catalyst, a rhodium-based metal catalyst, a palladium-based metal catalyst, a cobalt-based metal catalyst, a nickel-based metal catalyst, and an iron-based metal catalyst.

[4] The conductive coating material according to any one of [1] to [3],
in which each of the conductive powder (B1) and the conductive powder (B2) includes one or more types of powders selected from among gold, silver, copper, platinum, nickel, graphite, and a powder composed of two or more elements (for example, an alloy, metal, or resin coated with a metal).

[5] The conductive coating material according to any one of [1] to [4],
in which the average particle size of the conductive powder (B1) is 1.5 to 6.7 µm, more preferably 2 to 6.5 µm, and still more preferably 2 to 5 µm.

[6] The conductive coating material according to any one of [1] to [5],
in which the average particle size of the conductive powder (B2) is 1.5 to 5.5 µm, more preferably 2 to 5.5 µm, and still more preferably 2.5 to 5 µm.

[7] The conductive coating material according to any one of [1] to [6],
in which the mass ratio (A/B) of the silicone resin (A) to the conductive powder (B) is 15/85 to 30/70, and more preferably 15/85 to 25/75.

[8] The conductive coating material according to any one of [1] to [7],
in which a total content of the silicone resin (A) and the conductive powder (B) is equal to or higher than 70% by mass, more preferably equal to or higher than 80% by mass, still more preferably equal to or higher than 90% by mass, and still more preferably 100% by mass with respect to a total mass of the conductive coating material.

[9] The conductive coating material according to any one of [1] to [8],
in which the mass ratio (B1/B2) is 45/55 to 85/15, and more preferably 45/55 to 80/20.

[10] The conductive coating material according to any one of [1] to [9],
in which a total content of the conductive powder (B1) and the conductive powder (B2) is equal to or higher than 80% by mass, more preferably equal to or higher than 90% by mass, still more preferably equal to or higher than 95% by mass, and especially more preferably 100% by mass with respect to the total mass of the conductive powder (B).

[11] The conductive coating material according to any one of [1] to [10],
in which X1+X2 is 120 to 250, and more preferably 130 to 210.

[12] A circuit former including:
a substrate; and
a circuit,
in which the circuit is formed on the substrate from a coating film obtained by using the conductive coating material according to any one of [1] to [11].

Advantageous Effects of Invention

According to the present invention, it is possible to provide a conductive coating material capable of forming a coating film that exhibits excellent durability and a small rate of change in resistance value even under repeated stretching and contracting.

BRIEF DESCRIPTION OF DRAWINGS

The Drawing is a perspective view schematically showing a circuit former according to one embodiment of the present invention.

DESCRIPTION OF EMBODIMENTS

The definitions of the following terms are applied throughout the present specification and claims.

The term "conductivity" is used to distinguish from the term "insulation" in a general sense. For circuit patterns, it means that an electrical resistance value is preferably less than 150Ω.

The term "coating film" refers to a coating film formed from a conductive coating material of the present invention.

The term "to" indicating a numerical range means that numerical values before and after it are included as a lower limit value and an upper limit value.

Numerical ranges for a content, and various physical parameters and property values disclosed in the present specification can be set to new numerical ranges by optionally combining the lower limit values and upper limit values thereof.

[Conductive Coating Material]

A conductive coating material according to one embodiment of the present invention includes a silicone resin (A) and a conductive powder (B), as described below. The conductive coating material may further include a component other than the silicone resin (A) and the conductive powder (B) (hereinafter also referred to as an "optional component") as needed, as long as the effects of the present invention are not impaired.

<Silicone Resin (A)>

The silicone resin (A) is a resin that exhibits excellent durability and flexibility. Among the silicone resins (A), a curable silicone resin is preferable.

Examples of the curable silicone resin include an addition reaction-curable silicone resin, a condensation reaction-curable silicone resin, a radical reaction-curable silicone resin, and an ultraviolet beam- or electron beam-curable silicone resin. Among these, the addition reaction-curable silicone resin and the condensation reaction-curable silicone resin are preferable, with the addition reaction-curable silicone resin being more preferable, because, with those curable resins, both a thin coating film and a thick coating film can be formed and a film thickness can be easily adjusted according to the desired application.

The silicone resin (A) may be used alone or in combination with two or more types.

The addition reaction-curable silicone resin has a structure in which functional groups in two types of organopolysiloxanes are bonded and crosslinked to each other through an addition reaction.

The condensation reaction-curable silicone resin has a structure in which functional groups in two types of organopolysiloxanes, or functional groups in an organopolysiloxane and a silicon compound such as silica or silane, are bonded and crosslinked to each other through a condensation reaction.

As the silicone resin (A), commercially available products can be used.

Examples of a commercially available addition reaction-curable silicone resin include trade names "KE-1820" and "KE-1823" manufactured by Shin-Etsu Chemical Co., Ltd.; trade names "TSE-3221", "TSE-3250", and "TSE-3251" manufactured by Momentive Performance Materials Japan LLC; trade names "SE-1750" and "SE-4450" manufactured by Dow Toray Co., Ltd.; and trade names "SEMICOSIL 987 GR", "SEMICOSIL 988/1K GRAY", and "SEMICOSIL 989/1K" manufactured by Wacker Asahikasei Silicones Co. Ltd.

Examples of a commercially available condensation reaction-curable silicone resin include trade names "KE-441", "KE-471", and "KE-47" manufactured by Shin-Etsu Chemical Co., Ltd.; trade names "TSE-387" and "TSE-397" manufactured by Momentive Performance Materials Japan LLC; and trade names "SE-917G", "SE-9186", and "SE-9184" manufactured by Dow Toray Co., Ltd.

In a case where the addition reaction-curable silicone resin is used as the silicone resin (A), it is preferable to use a catalyst in combination to promote the addition reaction.

Examples of the catalyst include a platinum-based metal catalyst, a rhodium-based metal catalyst, a palladium-based metal catalyst, a cobalt-based metal catalyst, a nickel-based metal catalyst, and an iron-based metal catalyst. Among these, the platinum-based metal catalyst is preferable because it is the most widely used and it facilitates proceeding of an increase in the rate of the addition reaction.

The catalyst may be used alone or in combination with two or more types.

<Conductive Powder (B)>

The conductive powder (B) includes a flake-shaped conductive powder (B1) having an average particle size of 1 to 7 μm and an amorphous conductive powder (B2) having an average particle size of 1 to 6 μm. As the conductive powder (B) includes the flake-shaped conductive powder (B1) and the amorphous conductive powder (B2), a coating film that exhibits excellent durability and a small rate of change in resistance value even under repeated stretching and contracting can be formed.

The conductive powder (B) may further include a conductive powder other than the conductive powder (B1) and the conductive powder (B2) (hereinafter also referred to as "conductive powder (B3)") as needed, as long as the effects of the present invention are not impaired.

(Conductive Powder (B1))

The conductive powder (B1) is a flake-shaped conductive powder having an average particle size of 1 to 7 μm. An average thickness of a flake shape is usually $1/10$ to $1/2$ of the average particle size.

The conductive powder (B1) imparts conductivity to the coating film.

The conductive powder (B1) is not particularly limited as long as it is a conductive powder used in a conductive coating material. Examples thereof include metals such as gold, silver, copper, platinum, and nickel, as well as graphite. Among these, from the viewpoint of excellent conductivity and resistance to oxidation, silver is preferable.

In addition, the conductive powder (B1) may be composed of two or more elements, and may be, for example, an alloy, metal, or resin coated with the aforementioned metal. Among these, from the viewpoint of excellent conductivity and resistance to oxidation, either a metal other than silver with silver coating or a resin coated with silver is preferable.

The conductive powder (B1) may be used alone or in combination with two or more types.

In the present invention, the term "flake shape" can be expressed also as a scale shape, a flat shape, a plate shape, or a thin plate shape.

The average particle size of the conductive powder (B1) is 1 to 7 µm, preferably 1.5 to 6.7 µm, more preferably 2 to 6.5 µm, and still more preferably 2 to 5 µm. When the average particle size of the conductive powder (B1) is equal to or higher than the aforementioned lower limit value, the conductivity can be well maintained. When the average particle size of the conductive powder (B1) is equal to or lower than the aforementioned upper limit value, the coating film exhibits excellent durability even under repeated stretching and contracting.

The average particle size of the conductive powder (B1) is measured as follows. That is, an arithmetic mean size calculated from a volume distribution measured by a laser diffraction scattering particle size distribution measurement method is defined as the average particle size of the conductive powder (B1). Additionally, when a catalog value is available, the catalog value may be adopted as the average particle size of the conductive powder (B1) as a simplified measurement value.

(Conductive Powder (B2))

The conductive powder (B2) is an amorphous conductive powder having a size of 1 to 6 µm.

The conductive powder (B2) imparts conductivity to the coating film.

The conductive powder (B2) is not particularly limited as long as it can be a conductive powder used in a conductive coating material. Examples thereof include metals such as gold, silver, copper, platinum, and nickel, as well as graphite. Among these, from the viewpoint of excellent conductivity and resistance to oxidation, silver is preferable.

In addition, the conductive powder (B2) may be composed of two or more elements, and may be, for example, an alloy, metal, or resin coated with the aforementioned metal. Among these, from the viewpoint of excellent conductivity and resistance to oxidation, a metal other than silver or resin coated with silver is preferable.

The conductive powder (B2) may be used alone or in combination with two or more types.

In the present invention, the term "amorphous" refers to a shape other than a flake shape, and includes a shape where two or more types of various shapes such as a spherical shape, a cubic shape, a needle-like shape, a beaded shape, and a shape having protrusions on a surface like konpeito are mixed, making the shape indefinable; and an aggregate obtained by aggregating primary particles including one or more types of shapes selected from among a spherical shape, a cubic shape, a needle-like shape, a beaded shape, and a shape having protrusions on a surface like konpeito.

The average particle size of the conductive powder (B2) is 1 to 6 µm, preferably 1.5 to 5.5 µm, more preferably 2 to 5.5 µm, and still more preferably 2.5 to 5 µm. When the average particle size of the conductive powder (B2) is equal to or higher than the aforementioned lower limit value, the conductivity can be well maintained. In addition, the coating film exhibits excellent durability even under repeated stretching and contracting. When the average particle size of the conductive powder (B2) is equal to or lower than the aforementioned upper limit value, the coating film exhibits excellent durability even under repeated stretching and contracting.

The average particle size of the conductive powder (B2) is measured as follows. That is, an arithmetic mean size calculated from a volume distribution measured by the laser diffraction scattering particle size distribution measurement method is defined as the average particle size of the conductive powder (B2). Additionally, when a catalog value is available, the catalog value may be adopted as the average particle size of the conductive powder (B2) as a simplified measurement value.

(Conductive Powder (B3))

The conductive powder (B3) is a conductive powder other than the conductive powder (B1) and the conductive powder (B2).

Examples of the conductive powder (B3) include a flake-shaped conductive powder having an average particle size higher than 7 µm, an amorphous conductive powder having an average particle size higher than 6 µm, and a regular-shaped conductive powder such as a spherical conductive powder.

The conductive powder (B3) imparts conductivity to the coating film.

The conductive powder (B3) is not particularly limited as long as it is a conductive powder used in a conductive coating material. Examples thereof include metals such as gold, silver, copper, platinum, and nickel, as well as graphite. Among these, from the viewpoint of excellent conductivity and resistance to oxidation, silver is preferable.

In addition, the conductive powder (B3) may be composed of two or more elements, and may be, for example, an alloy, metal, or resin coated with the aforementioned metal, for example. Among these, from the viewpoint of excellent conductivity and resistance to oxidation, a metal other than silver or resin coated with silver is preferable.

The conductive powder (B3) may be used alone or in combination with two or more types.

<Optional Component>

Examples of the optional component include those that can be used in a known conductive coating material in the related art, such as organic solvents, binder resins other than silicone resin (A), dispersants, surface modifiers, thixotropic agents, adhesion promoters, and resin modifiers.

The optional component may be used alone or in combination with two or more types.

Meanwhile, among the aforementioned optional components, it is preferable not to include components having insulating properties that remain as solid content when formed into a coating film, as these components lower the conductive performance of the coating film. In addition, in a case where the conductive coating material includes an addition-reaction silicone resin as the silicone resin (A), it is preferable that impurities such as sulfur, which act as curing inhibitors, be substantially not included.

Here, the phrase "substantially not included" means that, except for unintended inclusions, components having insulating properties or impurities such as sulfur, which act as curing inhibitors, are not intentionally blended.

When the conductive coating material includes an organic solvent, viscosity can be easily adjusted.

As the organic solvent, a solvent capable of dissolving the silicone resin (A) is preferable. For example, a mixture such as a petroleum-based aliphatic hydrocarbon solvent or a petroleum-based aromatic solvent, and a single substance such as toluene, diethylbenzene, decalin, or dodecane can be used.

The organic solvent may be used alone or in combination with two or more types.

Examples of the binder resin other than the silicone resin (A) (hereinafter also referred to as "other binder resins") include polyester-based resins, phenoxy resins, polyamide resins, polyamide-imide resins, polyimide resins, polyurethane resins, acrylic resins, polystyrene, styrene-acrylic resins, styrene-butadiene copolymers, epoxy resins, phenol resins, polyether-based resins, polycarbonate-based resins, alkyd resins, polysulfone resins, polyether sulfone resins, vinyl chloride-vinyl acetate copolymer resins, ethylene-vinyl acetate copolymers, fluororesins, and resins obtained by subjecting these resins to silicone modification.

The other binder resins may be used alone or in combination with two or more types.

<Content/Mass Ratio>

A mass ratio (A/B) of the silicone resin (A) to the conductive powder (B) is 10/90 to 35/65, preferably 15/85 to 30/70, and more preferably 15/85 to 25/75. When the mass ratio (A/B) is equal to or higher than 10/90, the coating film exhibits excellent durability even under repeated stretching and contracting. In a case where the mass ratio (A/B) is equal to or lower than 35/65, the conductivity can be well maintained. In addition, the coating film exhibits excellent durability even under repeated stretching and contracting.

In a case where the addition reaction-curable silicone resin is used as the silicone resin (A) and the addition reaction-curable silicone resin and a catalyst are used in combination, a mass of the silicone resin (A) used for calculating the mass ratio (A/B) and a content of the silicone resin (A) described later include a mass of the catalyst. In addition, when the addition reaction-curable silicone resin and the catalyst are used in combination, a content of the catalyst is preferably 0.01 to 5 parts by mass, and more preferably 0.1 to 3 parts by mass with respect to 100 parts by mass of the addition reaction-curable silicone resin.

The total content of the silicone resin (A) and the conductive powder (B) is preferably equal to or higher than 70% by mass, more preferably equal to or higher than 80% by mass, still more preferably equal to or higher than 90% by mass, and may even be 100% by mass with respect to the total mass of the conductive coating material. That is, the conductive coating material may consist of only the silicone resin (A) and the conductive powder (B).

A mass ratio (B1/B2) of the conductive powder (B1) to the conductive powder (B2) is 40/60 to 90/10, preferably 45/55 to 85/15, and more preferably 45/55 to 80/20. In a case where the mass ratio (B1/B2) is equal to or higher than 40/60, the coating film exhibits excellent durability and a small rate of change in resistance value even under repeated stretching and contracting. In a case where the mass ratio (B1/B2) is equal to or lower than 90/10, the coating film exhibits excellent durability even under repeated stretching and contracting.

The total content of the conductive powder (B1) and the conductive powder (B2) is preferably equal to or higher than 80% by mass, more preferably equal to or higher than 90% by mass, still more preferably equal to or higher than 95% by mass, and may even be 100% by mass with respect to the total mass of the conductive powder (B). That is, the conductive powder (B) may consist of only the conductive powder (B1) and the conductive powder (B2).

<Expression (1)>

The conductive coating material satisfies Expression (1) below.

$$100 \leq X1 + X2 \leq 260 \tag{1}$$

X1=(the average particle size of the conductive powder (B1)/a tap density of the conductive powder (B1))×(the content of the conductive powder (B1) with respect to the total mass of the conductive powder (B))

X2=(the average particle size of the conductive powder (B2)/a tap density of the conductive powder (B2))×(the content of the conductive powder (B2) with respect to the total mass of conductive powder (B)).

X1+X2 is 100 to 260, preferably 120 to 250, and more preferably 130 to 210. In a case where X1+X2 is equal to or higher than the aforementioned lower limit value, the coating film exhibits excellent durability and a small rate of change in resistance value even under repeated stretching and contracting. In a case where X1+X2 is equal to or lower than the aforementioned upper limit value, the coating film exhibits excellent durability and a small rate of change in resistance value even under repeated stretching and contracting.

The tap densities of the conductive powder (B1) and the conductive powder (B2) are measured by a method conforming to JIS Z 2512:2012. Additionally, when a catalog value is available, the catalog value may be adopted as the tap densities of the conductive powder (B1) or the conductive powder (B2) as simplified measurement values.

<Manufacturing Method>

The conductive coating material is obtained by mixing the aforementioned silicone resin (A) and conductive powder (B), along with any optional components as needed.

For example, a mixer such as a roll mill or a planetary mixer may be used for mixing.

<Effects>

The conductive coating material of the present embodiment described above satisfies aforementioned Expression (1), contains the silicone resin (A) and the conductive powder (B) at a specific ratio, the conductive powder (B) including the flake-shaped conductive powder (B1) and the amorphous conductive powder (B2), which have a specific average particle size, at a specific ratio, and thereby is capable of forming a coating film that exhibits excellent durability and a small rate of change in resistance value even under repeated stretching and contracting.

<Application>

Examples of applications for the conductive coating material of the present embodiment include circuits for electronic components. Specific examples include applications for touch panel circuits, flexible substrates, and wearable devices. The conductive coating material of the present embodiment is a conductive coating material capable of forming a coating film that exhibits excellent durability and a small rate of change in resistance value even under repeated stretching and contracting. Therefore, it is particularly suitable for applications for flexible substrates and wearable devices requiring flexibility and elasticity.

[Circuit Former]

A circuit former according to one embodiment of the present invention has, on a substrate, a circuit formed from the coating film (hereinafter, also referred to as a "conductive coating film") obtained by using the aforementioned conductive coating material of the present invention. That is, the circuit former includes the substrate and the circuit, in which the circuit is formed on the substrate by using the conductive coating material of the present invention.

The Drawing shows an example of the circuit former of the present embodiment. A circuit former 10 shown in the Drawing includes a substrate 11 and a circuit 12 formed on the substrate 11.

As the substrate 11, a known substrate in the related art used as a wiring board can be used. Examples thereof include substrates consisting of inorganic materials such as a glass substrate, a ceramic substrate, and a silicone substrate, as well as substrates made of organic materials.

Examples of organic materials include polyesters such as polyethylene terephthalate and polyethylene naphthalate; silicones such as polydimethylsiloxane, polydiphenylpolysiloxane, and polyfluorosiloxane; urethanes such as thermoplastic polyurethane elastomer; polyimide; polyphenylene sulfide; polyolefins such as polyethylene and polypropylene; polyamide; polystyrene; acryl; polyvinyl alcohol; ethylene propylene diene; and epoxy. Among these, a substrate formed of silicone (silicone substrate) is preferable because it has good adhesiveness to the silicone resin in the conductive coating material.

The thickness of the substrate 11 may be appropriately set according to the application of the circuit former 10, but is preferably, for example, 20 to 600 μm. In a case where the thickness of the substrate 11 is within the aforementioned range, the circuit former 10 is likely to exhibit good elasticity and durability.

The method of forming the circuit 12 on the substrate 11 is not particularly limited. Examples thereof includes a method of applying the conductive coating material of the present invention onto the substrate 11 to create a desired circuit pattern, and then drying the circuit pattern to form the circuit 12 consisting of the coating film.

That is, one embodiment of the method of manufacturing the circuit former 10 includes a pattern-forming step of applying the conductive coating material of the present invention onto the substrate 11 to form a circuit pattern, and a drying step of drying the circuit pattern.

Examples of methods for applying the conductive coating material include screen printing, gravure printing, offset printing, roll coating, bar coating, dispensing, dipping, transfer, inkjet, and aerosol jet.

The drying temperature is preferably, for example, 70° C. to 160° C.

The drying time is preferably, for example, 2 to 60 minutes.

The circuit former of the present embodiment described above has the circuit formed from the coating film obtained by using the aforementioned conductive coating material of the present invention, thereby exhibiting excellent durability and a small rate of change in resistance value even under repeated stretching and contracting. Therefore, the circuit former of the present embodiment is particularly suitable for applications for flexible substrates and wearable devices requiring flexibility and elasticity.

EXAMPLES

A detailed description of the present invention will be given below using Examples, but the present invention is not limited thereto.

Examples 2 to 8, 10, 14, 16 to 19, and 22 to 27 are Examples, and examples 1, 9, 11 to 13, 15, 20, 21, 28, and 29 are Comparative Examples.

Materials used in each example are as follows.

[Materials]
A-1: Addition reaction-curable silicone resin (manufactured by Wacker Asahikasei Silicones Co. Ltd., product name "SEMICOSIL 989/1K", containing a platinum catalyst)
B1-1: Flake-shaped silver powder (manufactured by Tokuriki Chemical Research Co., Ltd., product name "TC-20V", average particle size: 3.6 μm, tap density: 3 g/cm$^3$).
B1-2: Flake-shaped silver powder (manufactured by Ames Goldsmith Corporation, product name "SF70M", average particle size: 2.1 μm, tap density: 3.15 g/cm$^3$)
B1-3: Flake-shaped silver powder (manufactured by Tokuriki Chemical Research Co., Ltd., product name "TC-506", average particle size: 6.7 μm, tap density: 5.5 g/cm$^3$).
B1-4: Flake-shaped silver powder (manufactured by Tokuriki Chemical Research Co., Ltd., product name "TC-25A", average particle size: 7.7 μm, tap density: 3.5 g/cm$^3$).
B2-1: Amorphous silver powder (manufactured by YOKOSAWA CHEMICAL. Co. Ltd, product name "Y-AF-K", average particle size: 3 μm, tap density: 1.15 g/cm$^3$).
B2-2: Amorphous silver powder (aggregate) (manufactured by Ames Goldsmith Corporation, product name "SPK-1", average particle size: 3 μm, tap density: 0.75 g/cm$^3$)
B2-3: Amorphous silver powder (manufactured by Ames Goldsmith Corporation, product name "SPG", average particle size: 5.36 μm, tap density: 1 g/cm$^3$)
B2-4: Amorphous silver powder (aggregate) (manufactured by Ames Goldsmith Corporation, product name "SPI", average particle size: 4.54 μm, tap density: 1.1 g/cm$^3$)
B2-5: Amorphous silver powder (manufactured by Tokuriki Chemical Research Co., Ltd., product name "C-34", average particle size: 0.34 μm, tap density: 2.25 g/cm$^3$)
B2-6: Amorphous silver powder (aggregate) (manufactured by Tokuriki Chemical Research Co., Ltd., product name "E-20", average particle size: 10.8 μm, tap density: 2 g/cm$^3$).
B2-7: Amorphous silver powder (manufactured by YOKOSAWA CHEMICAL. Co. Ltd, product name "Y-AE-K", average particle size: 2 μm, tap density: 1.3 g/cm$^3$).
B2-8: Amorphous silver powder (manufactured by MITSUI MINING & SMELTING CO., LTD., product name "SPN10JS", average particle size: 2 μm, tap density: 5.3 g/cm$^3$).
B3-1: Spherical silver powder (manufactured by DOWA ELECTRONICS MATERIALS CO., LTD., average particle size: 1.6 μm, tap density: 3.8 g/cm$^3$).

Examples 1 to 29

In accordance with the blending shown in Tables 1 to 3, 100 parts by mass in total of the silicone resin (A) and the conductive powder (B) were mixed and dispersed in 11 parts by mass of a solvent (dodecane) to obtain a conductive coating material with a solid content concentration of 90% by mass. In Tables 1 to 3, a blank indicates that a component thereof was not blended.

The conductive coating material was applied onto a substrate consisting of a silicone rubber material with dimensions of 15 mm in width, 70 mm in length, and 100 μm in thickness, using screen printing, to form a pattern with dimensions of 1 mm in width, 50 mm in length, and 20 μm in thickness. Thereafter, the coating film was dried at 160° C. for 60 minutes to be cured, thereby producing a test piece with a circuit pattern formed on the substrate.

The obtained test piece was evaluated for conductivity, a rate of change in resistance value, and durability as follows. The results are shown in Tables 1 to 3.

(1) Evaluation of Conductivity

An electrical resistance value between both ends of the circuit pattern in a longitudinal direction was measured using a digital multimeter (manufactured by ADC CORPORATION), and the conductivity was evaluated according to the following evaluation criteria.

A: The electrical resistance value was less than 10Ω.
B: The electrical resistance value was equal to or higher than 10Ω and less than 150Ω.
C: The electrical resistance value was equal to or higher than 150Ω.

(2) Evaluation of Rate of Change in Resistance Value

The circuit pattern with the initial length of 50 mm was extended to 60 mm and then returned to the initial length of 50 mm. Such stretching and contracting were repeated 100 times at a stretching and contracting rate of 500 mm/min, and a resistance value change test was performed. Thereafter, an electrical resistance value between both ends of the circuit pattern in the longitudinal direction was measured, and the rate of change in resistance value (([the electrical resistance value after 100 times of stretching and contracting]−[the electrical resistance value before the test])/[the electrical resistance value before the test]×100(%)) was calculated. The conductivity was then evaluated according to the following evaluation criteria.

A: The rate of change was less than 2,000%.
B: The rate of change was equal to or higher than 2,000% and less than 4,000%.
C: The rate of change was equal to or higher than 4,000%.

(3) Evaluation of Durability

A resistance value change test was conducted in the same manner as in (2). A difference between a rate of change in resistance value at the 10th stretching and contracting and a rate of change in resistance value at the 100th expansion and contraction ([the rate of change in resistance value at the 100th stretching and contracting]−[the rate of change in resistance value at the 10th stretching and contracting](%)) was obtained, and the conductivity was evaluated according to the following evaluation criteria.

A: The difference in the rate of change was less than 20%.
B: The difference in the rate of change was equal to or higher than 20% and less than 40%.
C: The difference in the rate of change was equal to or higher than 40%.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Silicone resin (A) (Parts by mass) | | A-1 | 17 | 17 | 17 | 17 | 17 | 17 | 17 | 17 | 17 | 17 |
| Conductive powder (B) (Parts by mass) | Flake-shaped conductive powder (B1) | B1-1 | 78.85 | 74.7 | 70.55 | 66.4 | | 66.4 | 66.4 | | | 66.4 |
| | | B1-2 | | | | | 66.4 | | | | | |
| | | B1-3 | | | | | | | | 66.4 | | |
| | | B1-4 | | | | | | | | | 66.4 | |
| | Amorphous conductive powder (B2) | B2-1 | 4.15 | 8.3 | 12.45 | 16.6 | | | | 16.6 | 16.6 | |
| | | B2-2 | | | | | 16.6 | | | | | |
| | | B2-3 | | | | | | | | | | 16.6 |
| | | B2-4 | | | | | | | 16.6 | | | |
| | | B2-5 | | | | | | | | | | |
| | | B2-6 | | | | | | | | | | |
| | | B2-7 | | | | | | | | | | |
| | | B2-8 | | | | | | | | 16.6 | | |
| | Conductive powder (B3) | B3-1 | | | | | | | | | | |
| Mass ratio | A/B | | 17/83 | 17/83 | 17/83 | 17/83 | 17/83 | 17/83 | 17/83 | 17/83 | 17/83 | 17/83 |
| | B1/B2 or B1/B3 | | 95/5 | 90/10 | 85/15 | 80/20 | 80/20 | 80/20 | 80/20 | 80/20 | 80/20 | 80/20 |
| | X1 + X2 | | 127.0 | 134.1 | 141.1 | 148.2 | 133.3 | 178.5 | 103.5 | 149.6 | 228.2 | 203.2 |
| Evaluation | Conductivity | Electrical resistance value (Ω) | 2.5 | 3 | 2.7 | 2.8 | 2.7 | 3 | 3 | 2.3 | 2.3 | 10 |
| | | Determination | A | A | A | A | A | A | A | A | A | B |
| | Rate of change in resistance value | Rate of change (%) | 1200 | 1300 | 1500 | 1500 | 1400 | 1600 | 1500 | 1800 | 2800 | 1600 |
| | | Determination | A | A | A | A | A | A | A | A | B | A |
| | Durability | Difference in rate of change (%) | 55 | 25 | 10 | 8 | 16 | 10 | 35 | 39 | 85 | 32 |
| | | Determination | C | B | A | A | A | A | B | B | C | B |

TABLE 2

|  |  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Silicone resin (A) (Parts by mass) |  | A-1 | 17 | 17 | 17 | 17 | 17 | 17 | 17 | 17 | 17 | 17 |
| Conductive powder (B) (Parts by mass) | Flake-shaped conductive powder (B1) | B1-1 | 37.35 | 70.55 | 66.4 | 58.1 |  | 49.8 | 37.35 |  | 33.2 | 29.05 |
|  |  | B1-2 |  |  |  |  | 58.1 |  |  | 37.35 |  |  |
|  |  | B1-3 |  |  |  |  |  |  |  |  |  |  |
|  |  | B1-4 |  |  |  |  |  |  |  |  |  |  |
|  | Amorphous conductive powder (B2) | B2-1 |  |  |  | 24.9 |  | 33.2 | 45.65 |  | 49.8 | 53.95 |
|  |  | B2-2 |  |  |  |  |  |  |  |  |  |  |
|  |  | B2-3 |  |  |  |  |  |  |  |  |  |  |
|  |  | B2-4 | 45.65 |  |  |  |  |  |  | 45.65 |  |  |
|  |  | B2-5 |  | 12.45 |  |  |  |  |  |  |  |  |
|  |  | B2-6 |  |  | 16.6 |  |  |  |  |  |  |  |
|  |  | B2-7 |  |  |  |  | 24.9 |  |  |  |  |  |
|  |  | B2-8 |  |  |  |  |  |  |  |  |  |  |
|  | Conductive powder (B3) | B3-1 |  |  |  |  |  |  |  |  |  |  |
| Mass ratio |  | A/B | 17/83 | 17/83 | 17/83 | 17/83 | 17/83 | 17/83 | 17/83 | 17/83 | 17/83 | 17/83 |
|  |  | B1/B2 or B1/B3 | 45/55 | 85/15 | 80/20 | 70/30 | 70/30 | 60/40 | 45/55 | 45/55 | 40/60 | 35/65 |
|  |  | X1 + X2 | 281.0 | 104.3 | 204.0 | 162.3 | 92.8 | 176.3 | 197.5 | 257.0 | 204.5 | 211.6 |
| Evaluation | Conductivity | Electrical resistance value (Ω) | 12 | 160 | 15 | 5.5 | 5.5 | 6 | 8 | 8 | 8 | 15 |
|  |  | Determination | B | C | B | A | A | A | A | A | A | B |
|  | Rate of change in resistance value | Rate of change (%) | 5000 | 3000 | 1600 | 1400 | 4500 | 1400 | 1600 | 3800 | 3200 | 4300 |
|  |  | Determination | C | B | A | A | C | A | A | B | B | C |
|  | Durability | Difference in rate of change (%) | 70 | 50 | 45 | 15 | 65 | 18 | 12 | 39 | 35 | 60 |
|  |  | Determination | C | C | C | A | C | A | A | B | B | C |

TABLE 3

|  |  |  | Example 21 | Example 22 | Example 23 | Example 24 | Example 25 | Example 26 | Example 27 | Example 28 | Example 29 |
|---|---|---|---|---|---|---|---|---|---|---|---|
| Silicone resin (A) (Parts by mass) |  | A-1 | 8 | 10 | 10 | 20 | 25 | 30 | 35 | 40 | 20 |
| Conductive powder (B) (Parts by mass) | Flake-shaped conductive powder (B1) | B1-1 | 73.6 |  | 72 | 64 | 60 | 56 | 52 | 48 | 64 |
|  |  | B1-2 |  | 72 |  |  |  |  |  |  |  |
|  |  | B1-3 |  |  |  |  |  |  |  |  |  |
|  |  | B1-4 |  |  |  |  |  |  |  |  |  |
|  | Amorphous conductive powder (B2) | B2-1 | 18.4 |  | 18 | 16 | 15 | 14 | 13 | 12 |  |
|  |  | B2-2 |  | 18 |  |  |  |  |  |  |  |
|  |  | B2-3 |  |  |  |  |  |  |  |  |  |
|  |  | B2-4 |  |  |  |  |  |  |  |  |  |
|  |  | B2-5 |  |  |  |  |  |  |  |  |  |
|  |  | B2-6 |  |  |  |  |  |  |  |  |  |
|  |  | B2-7 |  |  |  |  |  |  |  |  |  |
|  |  | B2-8 |  |  |  |  |  |  |  |  |  |
|  | Conductive powder (B3) | B3-1 |  |  |  |  |  |  |  |  | 16 |
| Mass ratio |  | A/B | 8/9 | 10/90 | 10/90 | 20/80 | 25/75 | 30/70 | 35/65 | 40/60 | 20/80 |
|  |  | B1/B2 or B1/B3 | 80/20 | 80/20 | 80/20 | 80/20 | 80/20 | 80/20 | 80/20 | 80/20 | 80/20 |
|  |  | X1 + X2 | 148.2 | 133.3 | 148.2 | 148.2 | 148.2 | 148.2 | 148.2 | 148.2 | 104.4 |
| Evaluation | Conductivity | Electrical resistance value (Ω) | 3 | 3.5 | 3.5 | 5.6 | 26 | 120 | 140 | 40M | 5.9 |
|  |  | Determination | A | A | A | A | B | B | B | C | A |
|  | Rate of change in resistance value | Rate of change (%) | 1200 | 1400 | 1500 | 1500 | 1600 | 1400 | 1300 | 1300 | 4500 |
|  |  | Determination | A | A | A | A | A | A | A | A | C |
|  | Durability | Difference in rate of change (%) | 105 | 38 | 38 | 6 | 12 | 18 | 28 | 45 | 70 |
|  |  | Determination | C | B | B | A | A | A | B | C | C |

Conductive coating materials obtained in Examples 2 to 8, 10, 14, 16 to 19, and 22 to 27 were capable of forming a coating film that exhibited excellent conductivity, excellent durability and a small rate of change in resistance value even under repeated stretching and contracting.

On the other hand, a coating film formed from a conductive coating material of Example 1, where the mass ratio (B1/B2) of the conductive powder (B1) to the conductive powder (B2) was 95/5, exhibited inferior durability.

A coating film formed from a conductive coating material of Example 9, which included a flake-shaped silver powder with an average particle size of 7.7 μm and did not include the flake-shaped conductive powder (B1) with the average particle size of 1 to 7 μm, exhibited inferior durability.

In a coating film formed from a conductive coating material of Example 11, where X1+X2 was 281, a resistance value significantly changed with repeated stretching and contracting. In addition, the coating film exhibited inferior durability.

A coating film formed from a conductive coating material of Example 12, which included an amorphous silver powder with an average particle size of 0.34 μm and did not include the amorphous conductive powder (B2) with an average particle size of 1 to 6 μm, exhibited inferior conductivity and durability.

A coating film formed from a conductive coating material of Example 13, which included an amorphous silver powder with an average particle size of 10.8 μm and did not include the amorphous conductive powder (B2) with an average particle size of 1 to 6 μm, exhibited inferior durability.

In a coating film formed from a conductive coating material of Example 15, where X1+X2 was 92.82, a resistance value significantly changed with repeated stretching and contracting. In addition, the coating film exhibited inferior durability.

In a coating film formed from a conductive coating material of Example 20, where the mass ratio (B1/B2) of the conductive powder (B1) to the conductive powder (B2) was 35/65, a resistance value significantly changed with repeated stretching and contracting. In addition, the coating film exhibited inferior durability.

A coating film formed from a conductive coating material of Example 21, where a mass ratio (A/B) of the silicone resin (A) to the conductive powder (B) was 8/92, exhibited inferior durability.

A coating film formed from a conductive coating material of Example 28, where the mass ratio (A/B) of the silicone resin (A) to the conductive powder (B) was 40/60, exhibited inferior conductivity and durability.

In a coating film formed from a conductive coating material of Example 29, which included a spherical conductive powder (B3) with an average particle size of 1.6 μm instead of the amorphous conductive powder (B2) with an average particle size of 1 to 6 μm, a resistance value significantly changed with repeated stretching and contracting. In addition, the coating film exhibited inferior durability.

INDUSTRIAL APPLICABILITY

The conductive coating material of the present invention is capable of forming a coating film that exhibits excellent durability and a small rate of change in resistance value even under repeated stretching and contracting, thereby being useful as a coating material for forming circuits in electronic components, such as touch panel circuits, flexible substrates, and wearable devices.

REFERENCE SIGNS LIST

10: Circuit former
11: Substrate
12: Circuit

The invention claimed is:

1. A conductive coating material, comprising:
a silicone resin (A); and
a conductive powder (B),
wherein a mass ratio (A/B) of the silicone resin (A) to the conductive powder (B) is 10/90 to 35/65,
the conductive powder (B) includes a flake-shaped conductive powder (B1) having an average particle size of 1 to 7 μm and an amorphous conductive powder (B2) having an average particle size of 1 to 6 μm,
a mass ratio (B1/B2) of the conductive powder (B1) to the conductive powder (B2) is 40/60 to 90/10, and Expression (1) below is satisfied, $$100 \leq X1+X2 \leq 260 \tag{1},$$

X1=(the average particle size of the conductive powder (B1)/a tap density of the conductive powder (B1))×(a content of the conductive powder (B1) with respect to a total mass of the conductive powder (B)),
X2=(the average particle size of the conductive powder (B2)/a tap density of the conductive powder (B2))×(a content of the conductive powder (B2) with respect to the total mass of the conductive powder (B)).

2. A circuit former comprising:
a substrate; and
a circuit,
wherein the circuit is formed on the substrate from a coating film obtained by using the conductive coating material according to claim 1.

* * * * *